United States Patent [19]
Matsuda

[11] Patent Number: 5,486,859
[45] Date of Patent: Jan. 23, 1996

[54] CHARGE-COUPLED DEVICE TYPE SOLID STATE IMAGING DEVICE MAKING BEST USE OF EFFECTIVE PIXELS AND OBTAINING IMAGES OF DIFFERENT TWO OR MORE KINDS OF ASPECT RATIOS

[75] Inventor: Fumiyoshi Matsuda, Souraku, Japan

[73] Assignee: Sharp Kabushiki Kaisha, Osaka, Japan

[21] Appl. No.: 147,850

[22] Filed: Nov. 3, 1993

[30] Foreign Application Priority Data

Nov. 6, 1992 [JP] Japan ................................ 4-296920
Oct. 12, 1993 [JP] Japan ................................ 5-254131

[51] Int. Cl.$^6$ ........................... H04N 5/335; H04N 5/225
[52] U.S. Cl. ........................... 348/311; 348/314; 348/321; 348/245; 348/445
[58] Field of Search ................................ 348/311, 314, 348/316, 319, 321, 441, 445, 230; H04N 5/335

[56] References Cited

U.S. PATENT DOCUMENTS

| | | | |
|---|---|---|---|
| 4,819,070 | 4/1989 | Hynecek | 848/302 |
| 4,995,061 | 2/1991 | Hynecek | 377/58 |

FOREIGN PATENT DOCUMENTS

| | | | |
|---|---|---|---|
| 0329189 | 8/1989 | European Pat. Off. | H04N 5/335 |
| 64-86680 | 3/1989 | Japan | H04N 5/335 |
| 1-188172 | 7/1989 | Japan | H04N 3/15 |
| 2-34089 | 2/1990 | Japan | H04N 5/335 |
| 3-198486 | 8/1991 | Japan | H04N 5/335 |
| 4-77510 | 12/1992 | Japan | H04N 5/335 |

OTHER PUBLICATIONS

Oda et al.–A 1920(H) X 1035(v) Pixel Hiel.–Definition CCD Image Sensor–Jan. 20, 1989–IEEE Log No. 8926941–pp. 711–717.
Patent Abstracts of Japan, vol. 12, No. 355 (E–661), Sep. 22, 1988.
Patent Abstracts of Japan, vol. 8, No. 29 (E–226), Feb. 7, 1984.

*Primary Examiner*—Joseph Mancuso
*Assistant Examiner*—Andrew B. Christensen
*Attorney, Agent, or Firm*—David G. Conlin; Kevin J. Fournier

[57] ABSTRACT

There is provided a low-cost CCD solid state imaging device which can make best use of effective pixels and which can obtain images of two or more kinds of aspect ratios without using digital signal processing or any optical means. For creation of wide aspect ratio images, an image is formed by signal charges transferred by a first horizontal CCD. On the other hand, an image is formed by signal charges transferred from the first horizontal CCD to a second horizontal CCD via a coupling, whereby a narrow aspect ratio image with a horizontal dimension shorter than a wide aspect ratio image is created by utilizing any arbitrary horizontal area out of all effective pixels of a light receiving portion, depending on the area where the first horizontal CCD and the second horizontal CCD are coupled with each other by the coupling.

11 Claims, 16 Drawing Sheets

CHARGE-COUPLED DEVICE TYPE SOLID STATE IMAGING DEVICE MAKING BEST USE OF EFFECTIVE PIXELS AND OBTAINING IMAGES OF DIFFERENT TWO OR MORE KINDS OF ASPECT RATIOS

BACKGROUND OF THE INVENTION

1. Field of the Invention

The present invention relates to a charge-coupled device type solid state imaging device (hereinafter, referred to as CCD solid state imaging device) for use in a video camera or the like.

2. Description of the Prior Art

CCD solid state imaging devices are purposed principally for outputting an image onto a television screen, where its aspect ratio, number of pixels, and the like are determined according to the television format. The aspect ratio refers to the ratio of a screen's horizontal dimension to vertical dimension.

In recent years, other than the aspect ratio of 4 : 3 that has been adopted in conventional television systems, there have been marketed televisions of wide aspect ratios of 16 : 9 and others that are horizontally widened than before. In correspondence to this, there have also been commercially available camera-integrated VTRs (Video Tape Recorders) that allow images of both aspect ratios of 4 : 3 and 16 : 9 to be obtained.

The solid state imaging device contained in the aforementioned camera-integrated VTRs is either one in which top and bottom parts of an image by the image sensor of the 4 : 3 aspect ratio are cut off by digital processing into an image of the 16 : 9 aspect ratio, or another in which a conversion lens is fitted in front of the lens to thereby optically compress the image into a 16 : 9 aspect ratio image.

Further, as the above CCD solid state imaging device, there has been proposed a solid state imaging device in which an image is horizontally cut off by digital processing or the like to result in a 4 : 3 aspect ratio image with the use of a solid state image sensor corresponding to the aspect ratio of 16 : 9.

However, in the CCD solid state imaging device in which top and bottom parts of an image by the solid state image sensor of a 4 : 3 aspect ratio is cut off, there is a problem that the vertical resolution would be deteriorated.

Further, in the CCD solid state imaging device in which right and left parts of a 16 : 9 aspect ratio image are cut off, the horizontal resolution for a 16 : 9 aspect ratio image could be ensured enough, compared with the case where an image by a solid state image sensor of a 4 : 3 aspect ratio is expanded right and left to obtain a 16 : 9 aspect ratio. But this would result in less use of effective pixels to obtain a 4 : 3 aspect ratio image, disadvantageously.

In this case, also, since the cutoff of an image and expansion of a time axis are necessarily performed by digital signal processing, the CCD solid state imaging device would become expensive, as another problem.

As still another problem, a CCD solid state imaging device using a conversion lens would not only involve increase in optical parts also but require troublesome operation.

SUMMARY OF THE INVENTION

The object of the present invention is therefore to provide a low-cost CCD solid state imaging device which can make best use of effective pixels and which allows images of different two or more kinds of aspect ratios to be obtained without using any digital processing or optical means.

In order to achieve the aforementioned object, according to a first aspect of the present invention, there is provided a CCD type solid state imaging device comprising a light receiving portion for receiving light and generating charges corresponding to the lights; a vertical CCD for transferring the charges from the light receiving portion in a vertical direction; a first horizontal CCD for receiving the charges from the vertical CCD and transferring the charges in a horizontal direction; a second horizontal CCD which is arranged in parallel to the first horizontal CCD and transfers the charges received from the first horizontal CCD in the horizontal direction; and a coupling for transferring the charges, which are being transferred in the horizontal direction by the first horizontal CCD, to the second horizontal CCD at any arbitrary time point during horizontal transfer by the first horizontal CCD.

Also, according to a second aspect of the invention, the CCD type imaging device further comprises charge discharging means for discharging at least part of charges present in the first horizontal CCD at any arbitrary time point.

Furthermore, according to a third aspect of the invention, the CCD type imaging device further comprises charge discharging means for discharging at least part of charges present in the second horizontal CCD at any arbitrary time point.

Further, according to a fourth aspect of the invention, the second horizontal CCD has a charge transfer ability of transferring all of charges transferred from the vertical CCD, and the CCD type solid state imaging device further comprises charge discharging means for discharging at least part of charges present in the second horizontal CCD at any arbitrary time point.

Further, according to a fifth aspect of the invention, the CCD type imaging device further comprises a horizontal optical black portion adjacent to the light receiving portion; first gate electrode means for transferring horizontal optical black signal charges generated by the horizontal optical black portion to the first horizontal CCD; and second gate electrode means for transferring the horizontal optical black signal charges from the first horizontal CCD to the second horizontal CCD.

Still further, according to a sixth aspect of the invention, the CCD type imaging device further comprises a first drain for discharging charges present in the first horizontal CCD; a second drain for discharging charges present in the second horizontal CCD; and a coupling CCD for coupling the first horizontal CCD and the second horizontal CCD with each other at their ends in proximity to a charge output circuit.

According to the first aspect of the present invention, wide aspect ratio images with the use of all effective pixels (light-receiving pixels) of the light receiving portion can be obtained by transferring charges from the vertical CCD to the first horizontal CCD and further transferring the charges in the horizontal direction by the first horizontal CCD.

To obtain narrow aspect ratio images, driving the coupling portion at any arbitrary time point during the transfer of charges in the horizontal direction by the first horizontal CCD will allow the charges to be transferred from the first horizontal CCD to the second horizontal CCD. Thereafter, the charges transferred from the first horizontal CCD are further transferred in the horizontal direction by the second horizontal CCD, whereby an image of a narrow aspect ratio can be obtained by making use of any horizontal area out of all the effective pixels of the light receiving portion, depending on the area where the first horizontal CCD and the second horizontal CCD are coupled with each other by the coupling. In this case, it is noted that the first horizontal CCD needs to have transferred all the charges transferred thereto from the vertical CCD so as to be empty by the time when it receives the next transfer of charges from the vertical CCD. On this account, it is necessary for the first horizontal CCD to be driven at higher speed than the second horizontal CCD or for the first horizontal CCD to drain charges remaining after the transfer of charges to the second horizontal CCD.

Specifically, to obtain images of a wide aspect ratio (e.g. 16 : 9), as in common solid state imaging devices of a constant aspect ratio, vertical transfer is effected during a blanking period in one horizontal period and signal charges are serially outputted by the first horizontal CCD.

On the other hand, to obtain images of a narrow aspect ratio (e.g. 4 : 3), signal charges are transferred from the vertical CCD to the first horizontal CCD during a period. Then, during next periods, the first horizontal CCD transfers the signal charges in the horizontal direction. In parallel to this operation of the first horizontal CCD, the second horizontal CCD transfers the signal charges, which have been transferred from the first horizontal CCD during the preceding horizontal period, in the horizontal direction for the periods. Thereafter, during a period, the signal charges are transferred from the first horizontal CCD to the second horizontal CCD. After this, the second horizontal CCD transfers the signal charges in the horizontal direction, so that an image signal is obtained from these signal charges.

Accordingly, narrow aspect ratio images with the use of any arbitrary horizontal area of light-receiving pixels can be obtained by changing the phase difference between charge transfer from the vertical CCD to the first horizontal CCD and that from the first horizontal CCD to the second horizontal CCD.

Also, according to the second aspect of the present invention, when a wide aspect ratio image is to be obtained, unnecessary charges remaining in the first horizontal CCD are discharged via the charge discharging means at the time of transfer of the charges from the first horizontal CCD to the second horizontal CCD. In the CCD solid state imaging device according to the second aspect of the invention, since unnecessary charges remaining in the first horizontal CCD can be discharged via the charge discharge means, charges unnecessary for a narrow aspect ratio image can be prevented from remaining in the first horizontal CCD even when the first horizontal CCD and the second horizontal CCD are driven at the same frequency, thus allowing a narrow aspect ratio image to be obtained.

Moreover, according to the third aspect of the present invention, after a narrow aspect ratio image has been obtained by effecting the horizontal transfer by the second horizontal CCD, unnecessary charges remaining in the second horizontal CCD are discharged via the charge discharging means. In the CCD solid state imaging device according to the third aspect of the invention, since unnecessary charges remaining in the second horizontal CCD can be discharged via the charge discharging means, it becomes possible to obtain images of any arbitrary aspect ratio horizontally narrower than the length of the second horizontal CCD.

When a narrow aspect ratio image is obtained by the CCD solid state imaging device according to the third aspect of the invention, unnecessary charges remaining in the second horizontal CCD are discharged via the charge discharging means, in a horizontal blanking period, during a period preceding a period during which charges are transferred from the first horizontal CCD to the second horizontal CCD.

Further, according to the fourth aspect of the present invention, when a wide aspect ratio image is to be obtained, charges from the vertical CCD are transferred from the first horizontal CCD to the second horizontal CCD without effecting the horizontal transfer by the first horizontal CCD. Then an image is obtained from charges outputted from the second horizontal CCD. Also, when a narrow aspect ratio image is to be obtained, each CCD is operated as was the case with the third aspect of the invention, and charges unnecessary for the narrow aspect ratio image may be discharged via the charge discharging means. As seen from the above description, the CCD solid state imaging device according to the fourth aspect of the invention allows images of any arbitrary aspect ratio from wide to narrow aspect ratios to be obtained only from the output of the second horizontal CCD.

Furthermore, according to the fifth aspect of the present invention, horizontal optical black signal charges generated by the horizontal optical black portion can be transferred from the vertical CCD to the second horizontal CCD via the first horizontal CCD without being mixed with the charges that are being transferred by the first horizontal CCD, independently of the charges generated by the light receiving portion.

As a result, it becomes possible to utilize horizontal optical black signals not only to create a wide aspect ratio image by charges transferred by the first horizontal CCD, but also to create a narrow aspect ratio image by signal charges transferred by the second horizontal CCD.

In this case, only charges of the light receiving portion are first transferred from the vertical CCD to the horizontal CCD 1. Thereafter, charges in the optical black portion are transferred to the second horizontal CCD via the first horizontal CCD at a period, and simultaneously the charges that have been transferred from the light receiving portion to the first horizontal CCD at the first period are transferred to the second horizontal CCD.

Moreover, according to the sixth aspect of the present invention, charges of horizontal CCDs of unnecessary lines are flowed out to the drain before joined together by the coupling CCD, so that only necessary signal charges can be led from the coupling CCD to the output circuit, allowing image signals to be outputted from a single output circuit. As a result, image signals of two types of aspect ratios (e.g. 16 : 9 and 4 : 3) can be obtained from a single output circuit.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The CCD solid state imaging devices of the present invention are now described in detail based on its embodiments illustrated in the accompanying drawings.

First Embodiment

Figure 1:
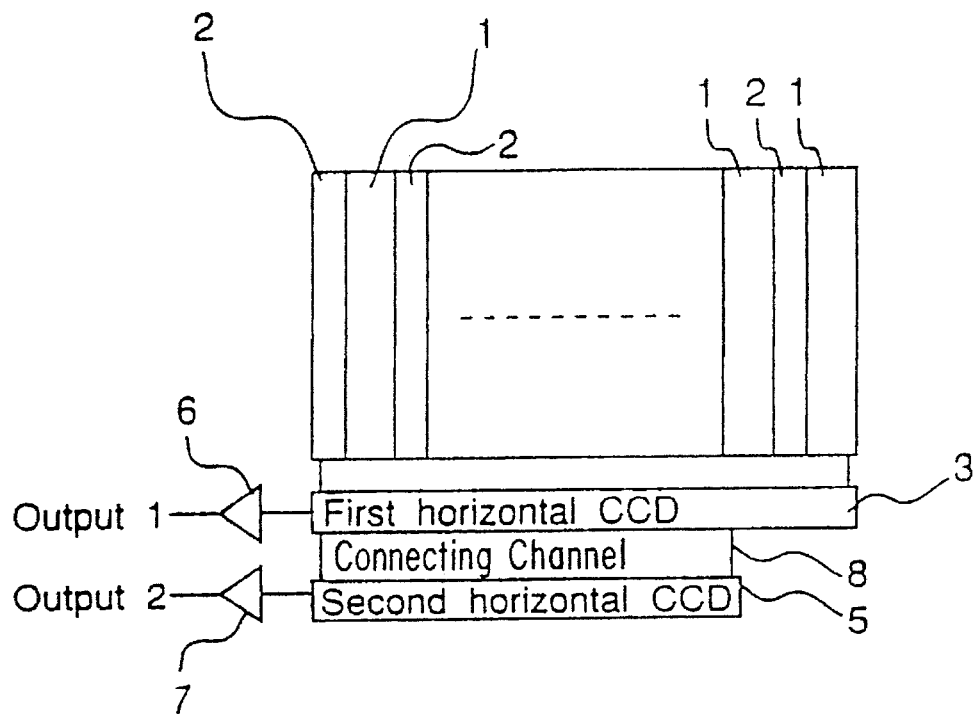
FIG. 1 is a block diagram of a CCD solid state imaging device of an embodiment according to the first aspect of the present invention.

FIG. 1 is a block diagram of the CCD solid state imaging device of a first embodiment of the present invention according to the first aspect thereof. As shown in FIG. 1, this first embodiment device comprises a light receiving portion 1 of an aspect ratio of 16 : 9, a vertical CCD 2, a first horizontal CCD 3, a second horizontal CCD 5, a first output circuit 6, a second output circuit 7, and a coupling 8, such as a connecting channel.

The light receiving portion 1 generates light receiving portion signal charges in correspondence to incident light, and the vertical CCD 2 in turn transfers the light receiving portion signal charges in the vertical direction. The configuration of the light receiving portion 1 and the vertical CCD 2 is of an interline transfer type in this embodiment, but it may be of a frame transfer type. The first horizontal CCD 3 has the signal charges transferred thereto from the vertical CCD 2, and transfers the signal charges in the horizontal direction. The second horizontal CCD 5, which is arranged in parallel to the first horizontal CCD 3, is coupled with the first horizontal CCD 3 by the connecting channel 8. The connecting channel 8 can transfer the signal charge, which is being transferred horizontally by the first horizontal CCD 3, to the second horizontal CCD 5 at any time point during the horizontal transfer by the first horizontal CCD 3.

The general function of the first embodiment device is described hereinafter. Wide aspect ratio images with the use of all effective pixels (light-receiving pixels) of the light receiving portion 1 can be obtained by transferring charges from the vertical CCD 2 to the first horizontal CCD 3 and further transferring the charges in the horizontal direction by the first horizontal CCD 3.

Figure 2:
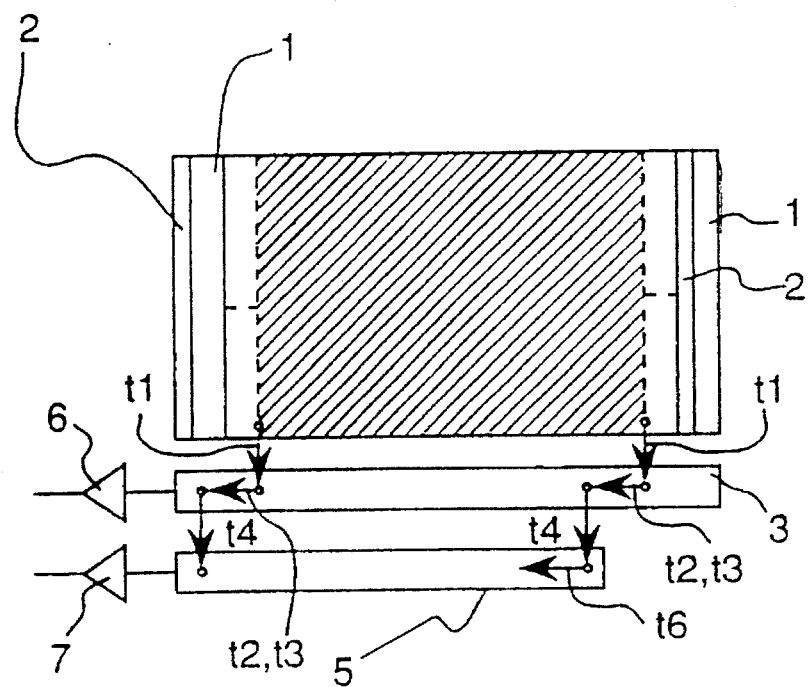
FIG. 2 is an operation conceptual diagram of the CCD solid state imaging device according to the first aspect of the present invention.

To obtain narrow aspect ratio images, as shown in the operation conceptual diagram of FIG. 2, driving the connecting channel 8 at any arbitrary time point during the transfer of charges in the horizontal direction by the first horizontal CCD 3 will allow the charges to be transferred from the first horizontal CCD 3 to the second horizontal CCD 5. Thereafter, the charges transferred from the first horizontal CCD 3 are further transferred in the horizontal direction by the second horizontal CCD 5, whereby an image of a narrow aspect ratio can be obtained by making use of any horizontal area out of all the effective pixels of the light receiving portion 1, depending on the area where the first horizontal CCD 3 and the second horizontal CCD 3 are coupled with each other by the connecting channel 8. In this case, it is noted that the first horizontal CCD 3 needs to have transferred all the charges transferred thereto from the vertical CCD 2 so as to be empty by the time when it receives the next transfer of charges from the vertical CCD 2. On this account, it is necessary for the first horizontal CCD 3 to be driven at higher speed than the second horizontal CCD 5 or for the first horizontal CCD 3 to drain charges remaining after the transfer of charges to the second horizontal CCD 5.

Figure 3:
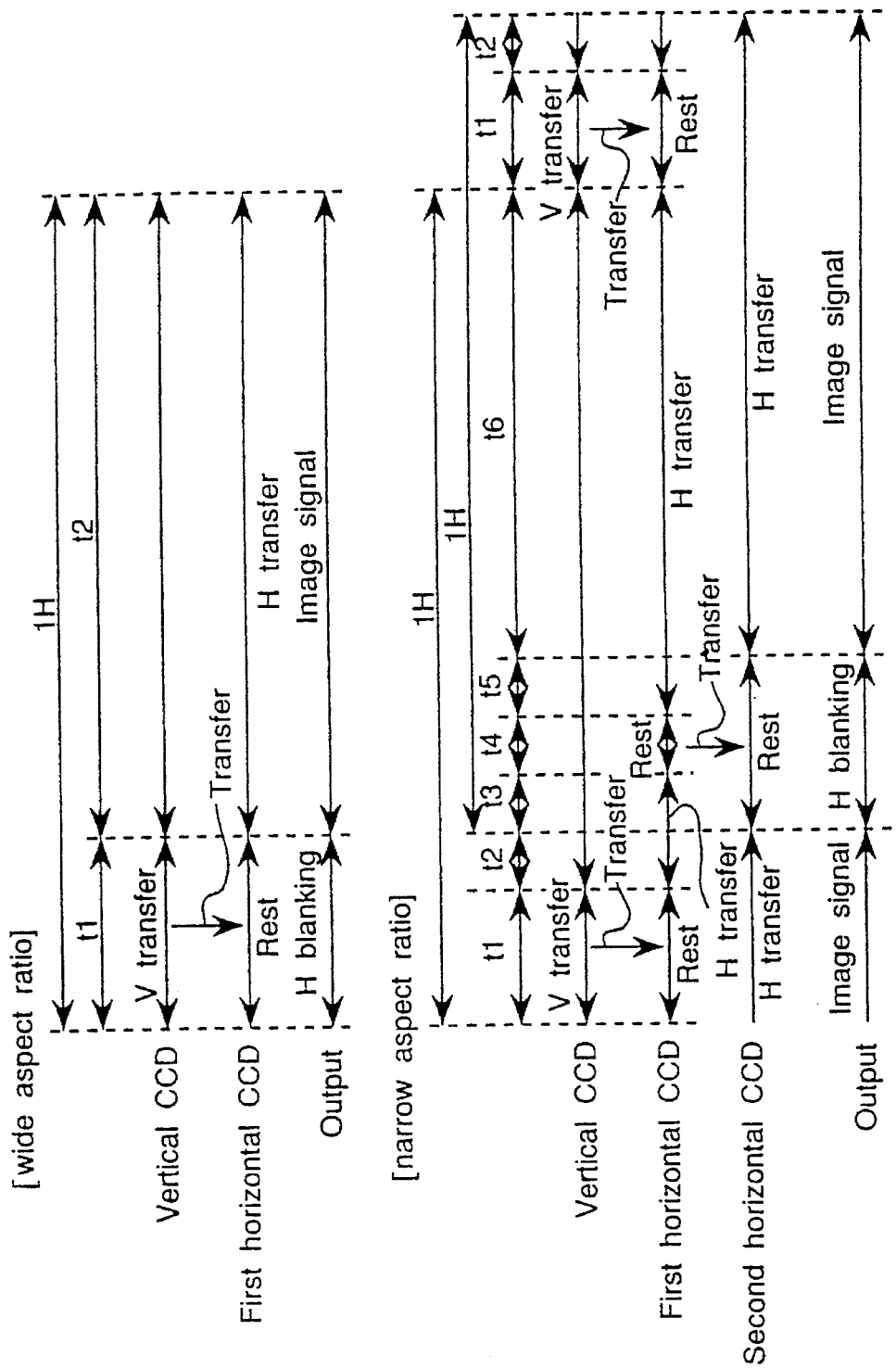
FIG. 3 is a timing chart for explaining the principle of operation of the CCD solid state imaging device according to the first aspect of the present invention.

FIG. 3 is a timing chart of the operation of the first embodiment device.

To obtain images of a wide aspect ratio (e.g. 16 : 9), as in common solid state imaging devices of a constant aspect ratio, vertical transfer is effected during a blanking period t1 in one horizontal period (1H) and signal charges are serially outputted by the first horizontal CCD 3.

On the other hand, to obtain images of a narrow aspect ratio (e.g. 4 : 3), signal charges are transferred from the vertical CCD 2 to the first horizontal CCD 3 during a period t1. Then, during periods t2 and t3, the first horizontal CCD 3 transfers the signal charges in the horizontal direction. In parallel to this operation of the first horizontal CCD 3, the second horizontal CCD 5 transfers the signal charges, which have been transferred from the first horizontal CCD 3 during the preceding horizontal period, in the horizontal direction for a complete period from period t1 to period t2. Thereafter, during a period t4, the signal charges are transferred from the first horizontal CCD 3 to the second horizontal CCD 5. After this, the second horizontal CCD 5 transfers the signal charges in the horizontal direction, so that an image signal is obtained from these signal charges.

Accordingly, as shown in FIG. 2, narrow aspect ratio images with the use of any horizontal area of light-receiving pixels can be obtained by making the difference between a timing of charge transfer from the vertical CCD 2 to the first horizontal CCD 3 and that from the first horizontal CCD 3 to the second horizontal CCD 5.

Figure 4:
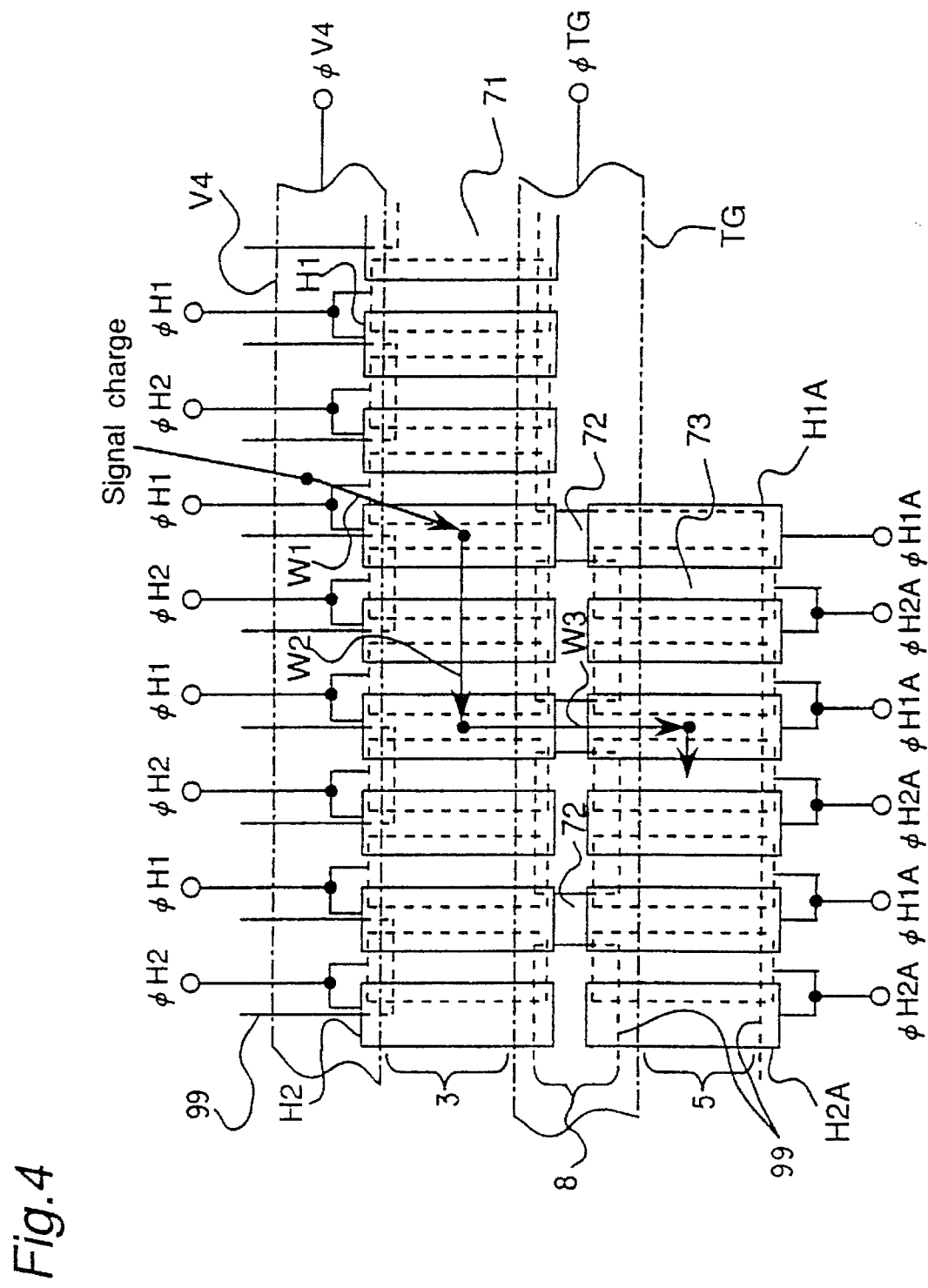
FIG. 4 is a view showing the detail of the horizontal CCDs of the embodiment according to the first aspect of the invention.

A detailed structure of the first horizontal CCD 3, the second horizontal CCD 5 and the connecting channel 8 is shown in FIG. 4. As shown in FIG. 4, the first horizontal CCD 3 has a channel 71, and horizontal transfer gate electrodes H1, H2. Also, the second horizontal CCD 5 has a channel 73, and horizontal transfer gate electrodes H2A, H1A. V4 denotes a gate electrode for transferring signal charges from the vertical CCD 2 to the first horizontal CCD 3, and TG denotes a gate electrode for transferring signal charges from the first horizontal CCD 3 to the second horizontal CCD 5. Numeral 99 denotes channel stops.

The channel 71 of the first horizontal CCD 3 is connected to the channel 73 of the second horizontal CCD 5 by a connecting channel 72 between the gate electrode H1 and the gate electrode H1A and under the gate electrode TG. The gate electrode TG and the connecting channel 72 make up the connecting channel 8. Therefore, by changing pulse potentials φH1, φH1A, and φTG to be applied to the gate electrodes TG, H1, and H1A, signal charges can be transferred from under the gate electrode H1 to under the gate electrode H1A. That is, signal charges can be transferred from the first horizontal CCD 3 to the second horizontal CCD 5 via the coupling 8.

According to the above embodiment, in order to create an image of a wide aspect ratio of 16 : 9, signal charges generated by the light receiving portion 1 are transferred to the first horizontal CCD 3 via the vertical CCD 2, and the signal charges are transferred from the first horizontal CCD 3 to the first output circuit 6, thereby creating an image signal. Consequently, in this case, a wide aspect ratio image can be created by using effective pixels of the entire area of the light receiving portion 1.

Figure 5:
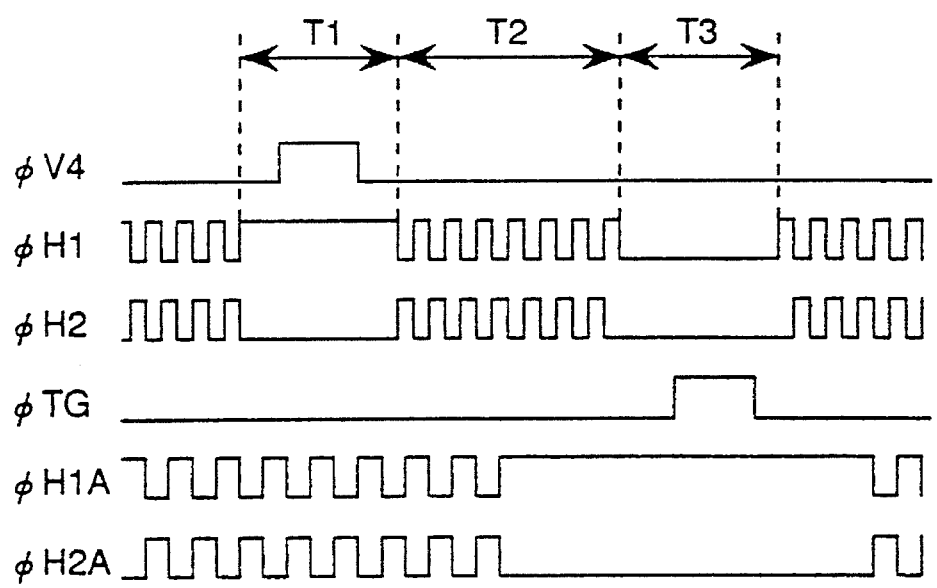
FIG. 5 is a driving timing chart of the same embodiment.

On the other hand, FIG. 5 is a timing chart of driving pulse signals φH1 and φH2, φH1A and φH2A, φV4 and φTG to be applied to the gate electrodes H1 and H2, H1A and H2A, V4 and TG, respectively, in the case of a narrow aspect ratio of 4 : 3, i.e. in the case where the horizontal dimension of the screen is made smaller than the specified dimension for the aspect ratio of 16: 9.

As shown in FIG. 5, first, during a period T1, signal charges are transferred from the vertical CCD 2 to the first horizontal CCD 3 through a route W1 as shown in FIG. 4 by a driving pulse signal φV4 applied to the gate electrode V4.

Next, during a period T2, the signal charge is transferred in the horizontal direction within the first horizontal CCD 3 as shown by a route W2 by the driving pulse signals φH1 and φH2 applied to the gate electrodes H1 and H2, respectively.

Subsequently, during a period T3, the signal charge under the gate electrode H1 is transferred to under the gate electrode H1A through the connecting channel 72 under the electrode TG, as shown by a route W3, by the driving pulse signal φTG being applied to the gate electrode TG and the driving pulse signals φH1 and φH1A being applied to the gate electrodes H1 and H1A. That is, during the period T3, the signal charge is transferred from the first horizontal CCD 3 to the second horizontal CCD 5 via the connecting channel 8. Thereafter, the second horizontal CCD 5 transfers the signal charge to the second output circuit 7, and the second output circuit 7 in turn outputs an image signal. Then, the first horizontal CCD 3 further transfers signal charges, sweeping out signal charges of all unwanted pixels unnecessary for a narrow aspect ratio image by the period T1 of the next cycle.

In this way, the present embodiment device is capable of transferring part of the signal charges that are being transferred by the first horizontal CCD 3, to the second horizontal CCD 5 by the connecting channel 8. Accordingly, by outputting signal charges from the second horizontal CCD 5 to the second output circuit 7, a narrow aspect ratio image formed by pixels of any arbitrary horizontal area out of all the effective pixels of the light receiving portion 1 can be created.

As a result, according to this embodiment, effective pixels of the light receiving portion can be sufficiently utilized so that there can be obtained an image of a wide aspect ratio of 16 : 9 and another of a narrow aspect ratio of 4 : 3 without using digital signal processing or any optical means.

Second embodiment

Figure 6:
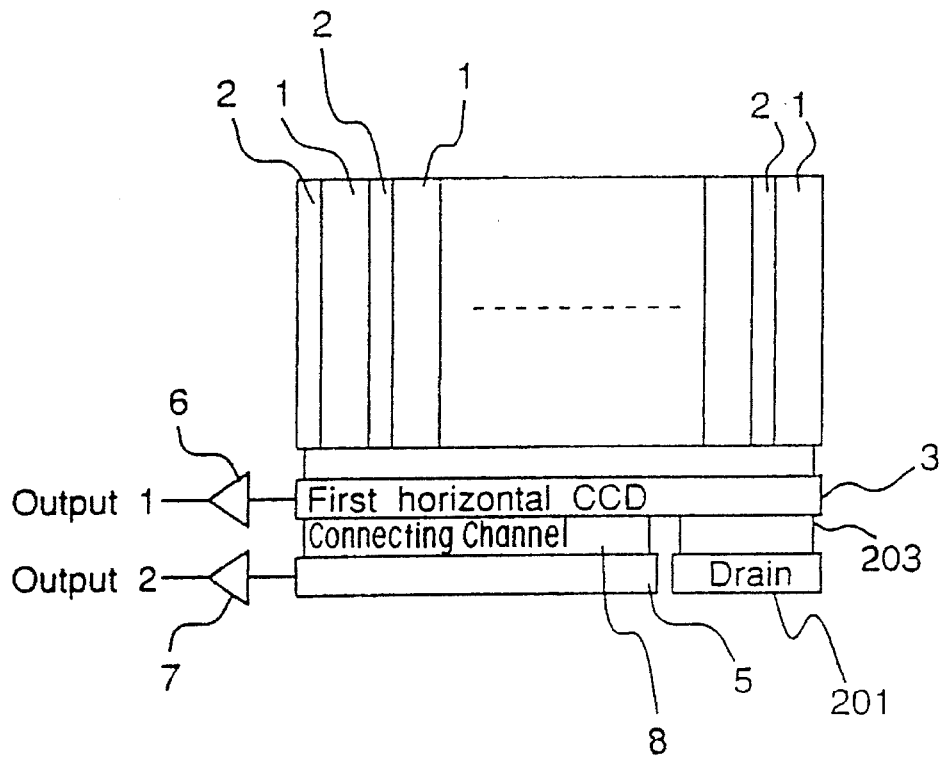
FIG. 6 is a block diagram of an embodiment according to the second aspect of the invention.
Figure 8:
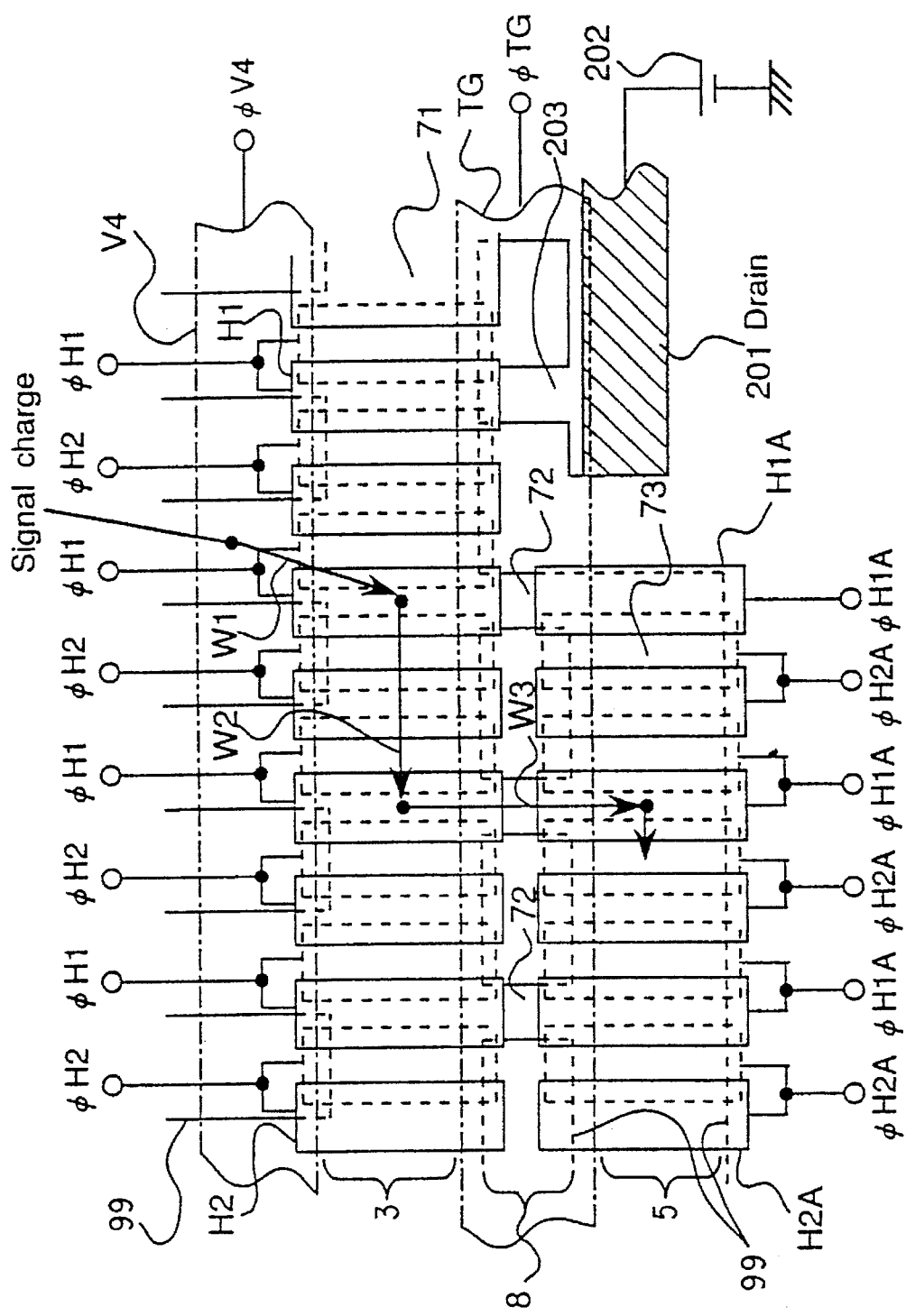
FIG. 8 is a view showing the detail of the embodiment according to the second aspect of the invention.

Next, FIG. 6 is a block diagram of a second embodiment of the present invention according to its second aspect. This embodiment device comprises a drain 201 and a connecting channel 203 in addition to the arrangement of the first embodiment as shown in FIG. 1. More specifically, the second embodiment device comprises the connecting channel 203 sandwiched between channel stops 99, the drain 201, and a DC power supply 202 connected between the drain 201 and ground as shown in FIG. 8, in addition to the first embodiment. Thus, like parts to the first embodiment are designated by like numerals, their description being omitted.

As shown in FIG. 8, in the second embodiment device, a first horizontal CCD 3 and the drain 201 are connected to each other by the connecting channel 203 under a gate electrode TG. Thus, by driving the gate electrode TG, charges can be transferred from the first horizontal CCD 3 to the second horizontal CCD 5. Simultaneously with this, unnecessary charges can be discharged from the first horizontal CCD 3 to the drain 201 via the connecting channel 203, and moreover discharged from the drain 201 to the ground.

Figure 7:
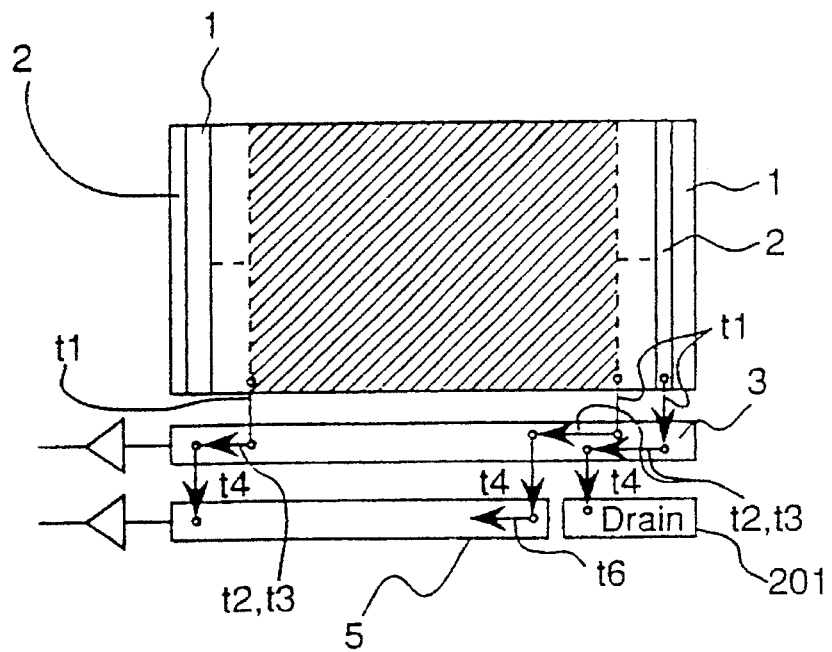
FIG. 7 is an operation conceptual diagram of the embodiment according to the second aspect of the invention.

In this second embodiment, as shown in FIG. 7, in obtaining a narrow aspect ratio image, unnecessary charges remaining in the first horizontal CCD 3 are discharged via the drain 201 when the charges are transferred from the first horizontal CCD 3 to the second horizontal CCD 5. This drain 201 serves as an electric-charge discharging means. The second embodiment device is capable of discharging unnecessary charges remaining in the first horizontal CCD 3 via the drain 201. Accordingly, even when the first horizontal CCD 3 and the second horizontal CCD 5 are driven at the same frequency, charges unnecessary for a narrow aspect ratio image are prevented from remaining in the first horizontal CCD 3, allowing a narrow aspect ratio image to be obtained.

In consequence, compared with the first embodiment where the first horizontal CCD 3 needs to be driven at a higher frequency than the second horizontal CCD 5 in order to empty the first horizontal CCD 3 by transferring all the charges present in the first horizontal CCD 3 during one horizontal scanning period, the second embodiment device is capable of discharging unnecessary charges via the drain 201, so that the first horizontal CCD 3 and the second horizontal CCD 5 may be driven at the same frequency. As a result, according to the second embodiment, narrow aspect ratio images can be easily obtained.

Third Embodiment

Figure 9:
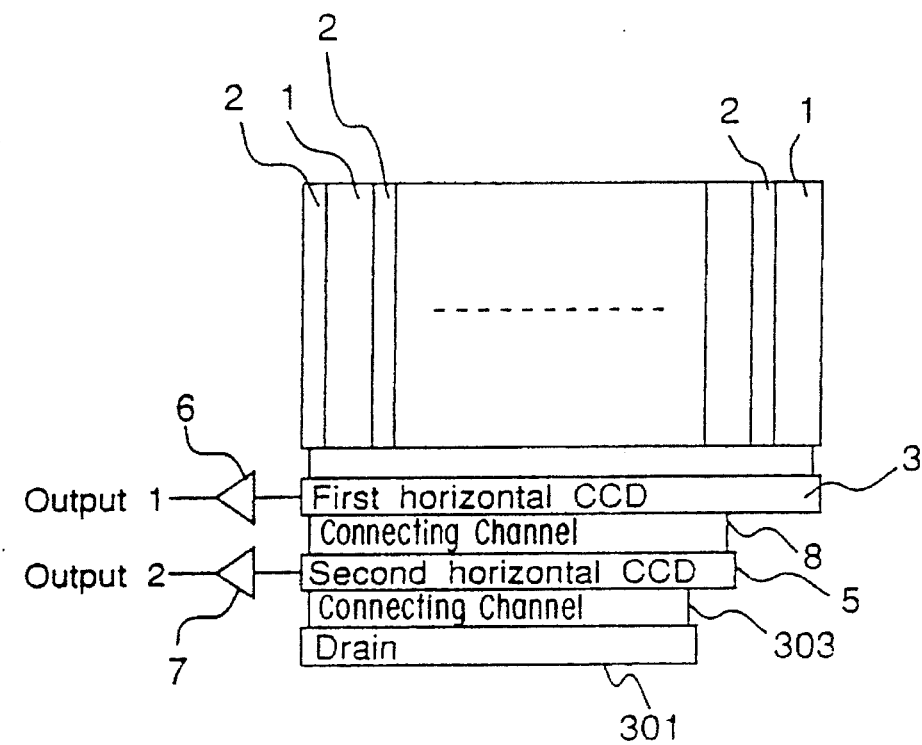
FIG. 9 is a block diagram of an embodiment according to the third aspect of the invention.
Figure 11:
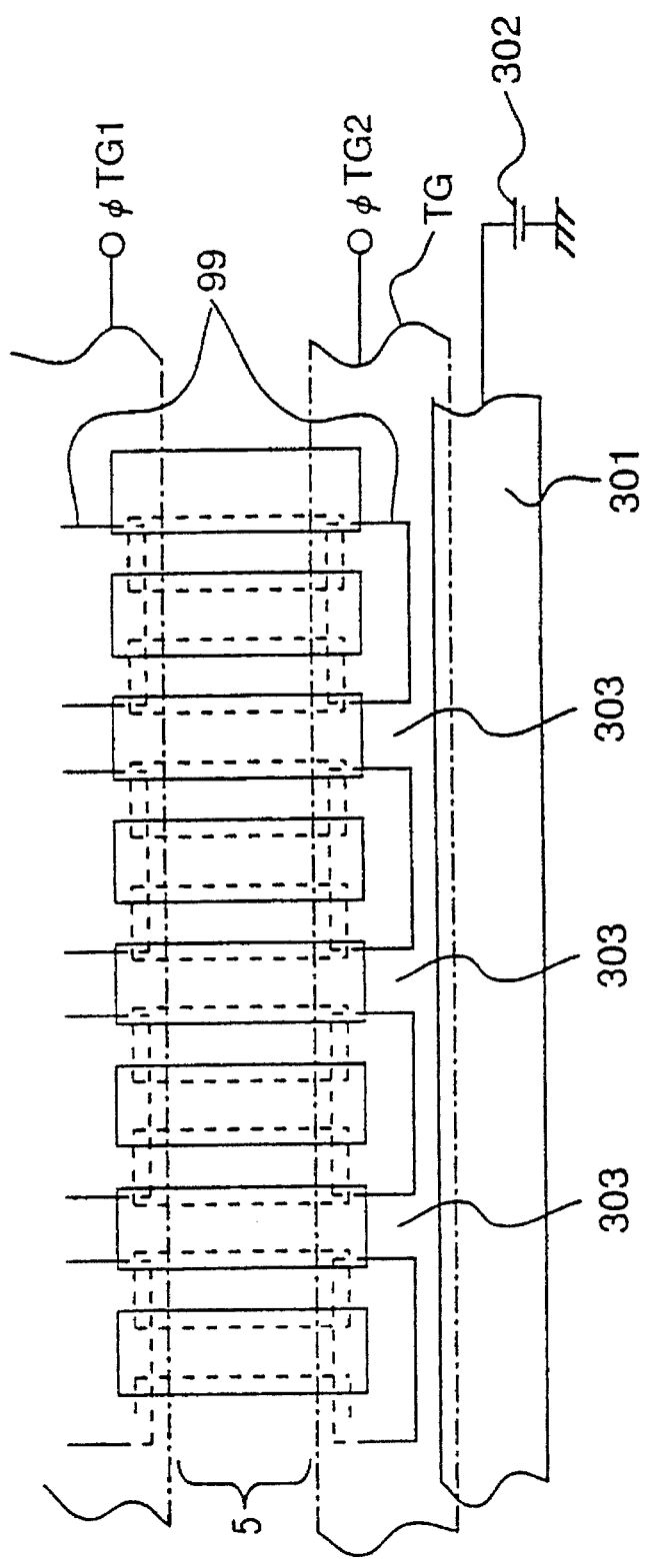
FIG. 11 is a view showing the detail in the vicinity of the drain of the embodiment according to the third aspect of the invention.

Next, FIG. 9 is a block diagram of a third embodiment according to the third aspect of the present invention. The third embodiment device comprises a drain 301 and a connecting channel 303, in addition to the arrangement of the first embodiment shown in FIG. 1. More specifically, the third embodiment differs from the first embodiment in that the device comprises the connecting channel 303 sandwiched between channel stops 99, the drain 301, and a DC power supply 302 connected between the drain 301 and ground, as shown in FIG. 11. Accordingly, like parts to the first embodiment are designated by like numerals, their description being omitted.

As shown in FIG. 11, in the third embodiment device, a second horizontal CCD 5 and the drain 301 are connected to each other via the connecting channel 303 under a gate electrode TG. The drain 301 is connected to the ground via the DC power supply 302. Then by applying a driving signal φTG2 to the gate electrode TG, charges present in the second horizontal CCD 5 can be discharged to the drain 301 via the connecting channel 303 at any arbitrary time point.

Figure 10:
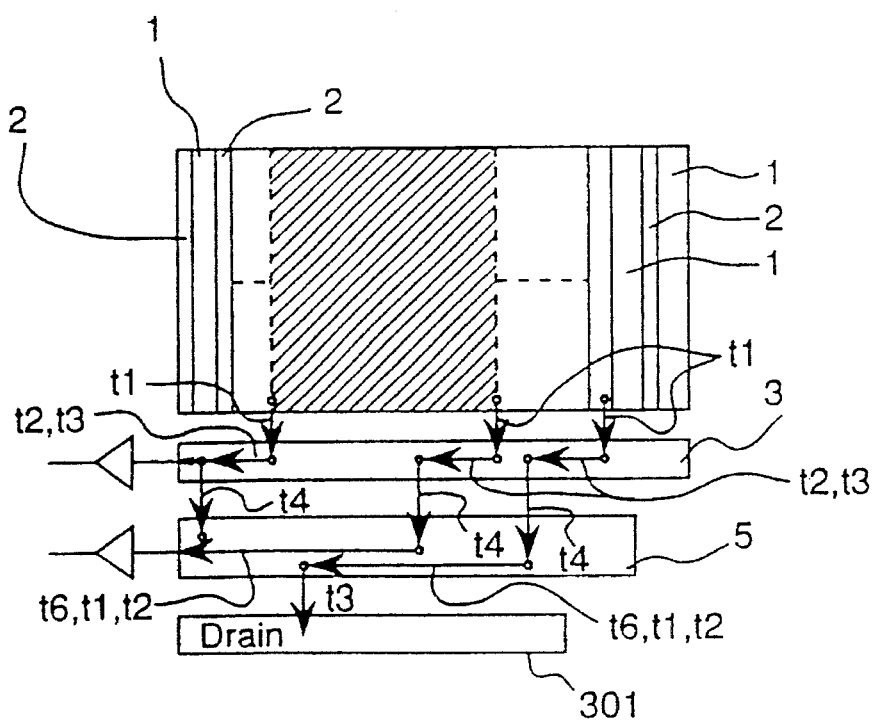
FIG. 10 is an operation conceptual diagram of the embodiment according to the third aspect of the invention.

In the third embodiment, as shown in FIG. 10, after a narrow aspect ratio image has been obtained by effecting horizontal transfer by the second horizontal CCD 5, unnecessary charges remaining in the second horizontal CCD 5 are discharged via the drain 301. This drain 301 serves as the electric-charge discharging means. In this third embodiment, since unnecessary charges remaining in the second horizontal CCD 5 can be discharged via the drain 301, it becomes possible to obtain images of any arbitrary aspect ratio horizontally narrower than the length of the second horizontal CCD 5.

Figure 12:
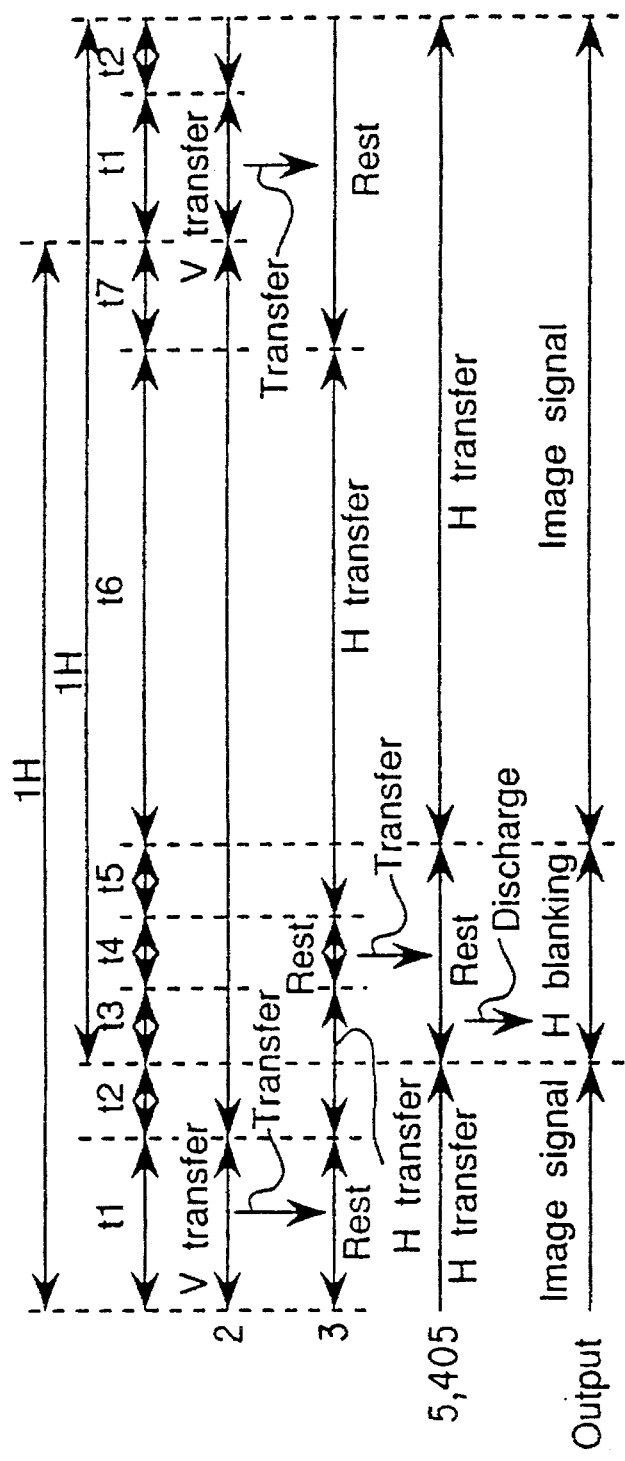
FIG. 12 is a driving timing chart in obtaining a narrow aspect ratio image in the embodiments according to the third and fourth aspects of the invention.

FIG. 12 is a driving timing chart of each CCD in obtaining a narrow aspect ratio image by the third embodiment. The figure shows that, in a horizontal blanking period, during a period t3 preceding a period during which charges are transferred from the first horizontal CCD 3 to the second horizontal CCD 5, unnecessary charges remaining in the second horizontal CCD 5 are discharged via the drain 301.

As seen from the above description, compared with the first embodiment where because of the necessity that charges present in the second horizontal CCD 5 be horizontally transferred and read in all for obtaining a narrow aspect ratio image, the aspect ratio is determined depending on the number of transfer steps of the second horizontal CCD 5, the third embodiment is such that after the charges present in the second horizontal CCD 5 have been read at a lower frequency than in the first embodiment, charges remaining in the second horizontal CCD 5 can be discharged via the drain 301. As a result, according to the third embodiment, it becomes possible to obtain images of any arbitrary aspect ratio narrower than the first embodiment.

In addition, the second embodiment device of FIG. 6 may be further provided with the drain 301 and the connecting channel 303 of the third embodiment of FIG. 9.

Fourth Embodiment

Figure 13:
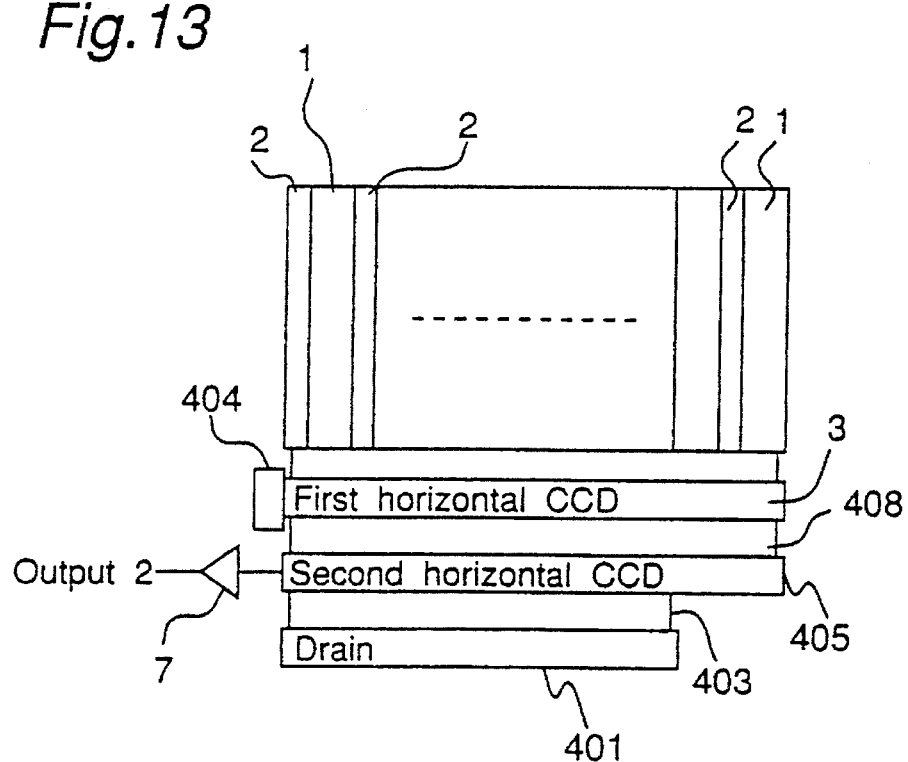
FIG. 13 is a block diagram of an embodiment according to the fourth aspect of the invention.

Next, FIG. 13 is a block diagram of a fourth embodiment according to the fourth aspect of the present invention. This fourth embodiment differs from the first embodiment in that the device comprises a second horizontal CCD 405 equal in length (number of transfer steps) to the first horizontal CCD 3 and a connecting channel 408 instead of the second horizontal CCD 5 and the connecting channel 8 of the first embodiment shown in FIG. 1, that it also comprises a drain 401 and a connecting channel 403 for discharging part of charges present in the second horizontal CCD 405 at any arbitrary time point, and that it further comprises a drain 404 for discharging charges present in the first horizontal CCD 3 instead of the first output circuit 6 of the third embodiment. Accordingly, like parts to the first embodiment are designated by like numerals, their description being omitted, and only the differences from the first embodiment are described below.

Figure 14:
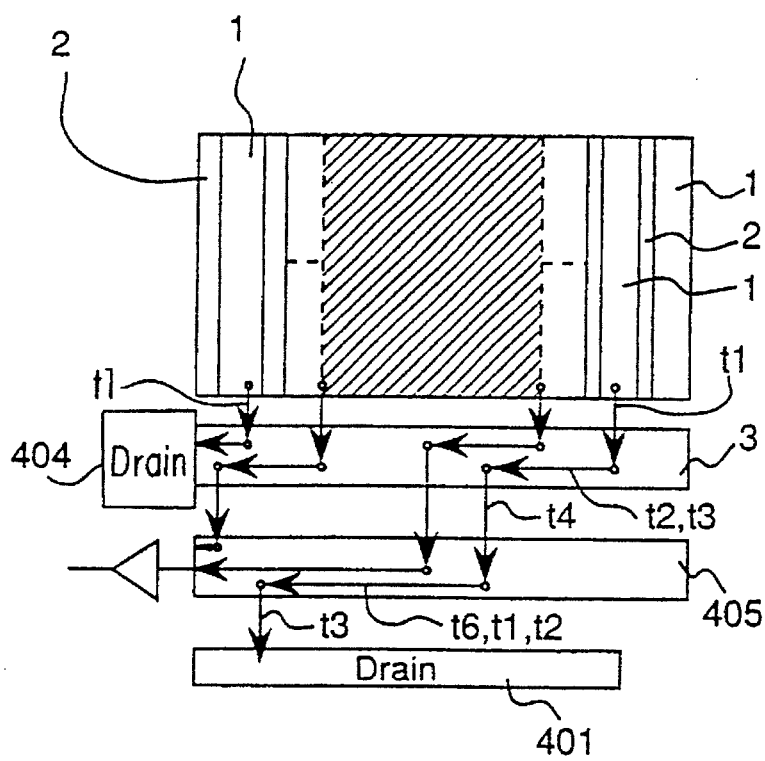
FIG. 14 is an operation conceptual diagram of the embodiment according to the fourth aspect of the invention.
Figure 15:
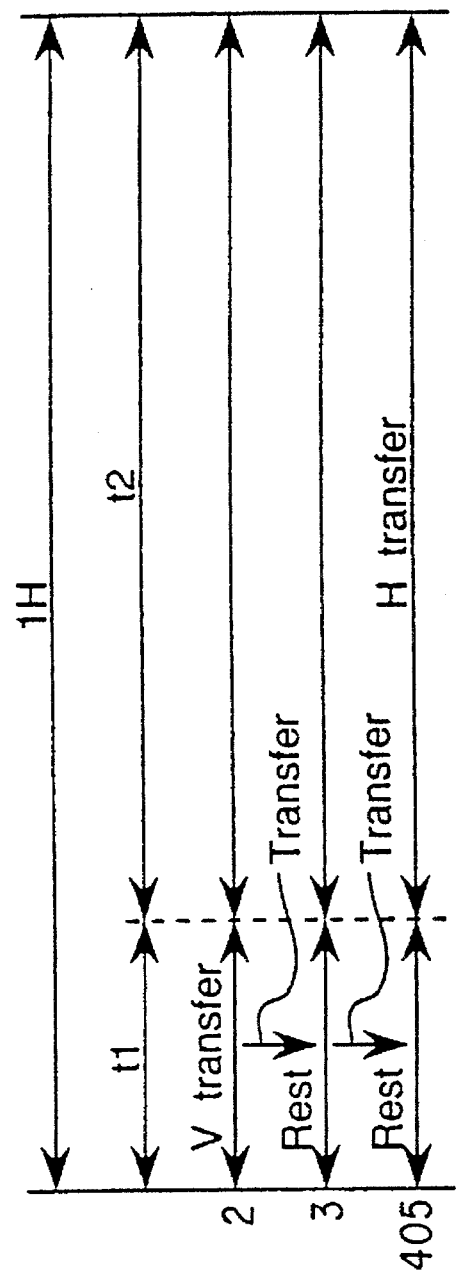
FIG. 15 is a driving timing chart in obtaining a wide aspect ratio image in the embodiment according to the fourth aspect of the invention.

In the fourth embodiment, in obtaining a wide aspect ratio image utilizing all the light-receiving pixels, charges from the vertical CCD are transferred from the first horizontal CCD 3 to the second horizontal CCD 405 via the connecting channel 408 without effecting horizontal transfer by the first horizontal CCD 3, as shown in FIG. 15. Then, by horizontally transferring the charges by the second horizontal CCD 405, an image is obtained via the second output circuit 7. In obtaining a narrow aspect ratio image, each CCD is operated as shown in FIG. 14 at the driving timing as shown in FIG. 12, and charges are read from the second horizontal CCD 405 at a lower frequency than in the above case for obtaining a wide aspect ratio image. Thereafter, unnecessary charges remaining in the second horizontal CCD 405 are discharged to the drain 401 via the connecting channel 403.

Accordingly, in the fourth embodiment, it becomes possible to obtain images of any arbitrary aspect ratio from wide to narrow aspect ratios only from the output of the second horizontal CCD 405.

Fifth Embodiment

Figure 16:
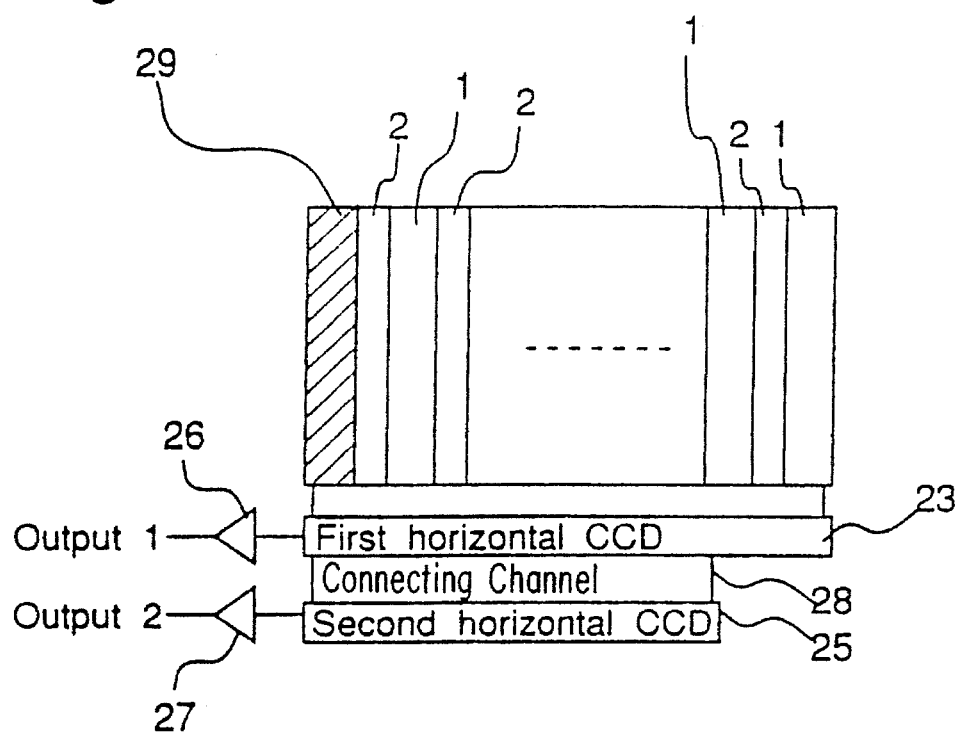
FIG. 16 is a block diagram of a CCD solid state imaging device of an embodiment according to the fifth aspect of the present invention.

Next, FIG. 16 is a block diagram of a fifth embodiment according to the fifth aspect of the present invention. This embodiment differs from the first embodiment as shown in the block diagram of FIG. 1 in that the device comprises a horizontal optical black portion 29 adjacent to the light receiving portion 1, as well as in the structure of gate electrodes for transferring signal charges in the vertical direction. Therefore, its differences from the first embodiment are mainly described below.

As shown in FIG. 16, the fifth embodiment device comprises a horizontal optical black portion 29 adjacent to the light receiving portion 1. The horizontal optical black portion 29 generates horizontal optical black signal charges.

Figure 17:
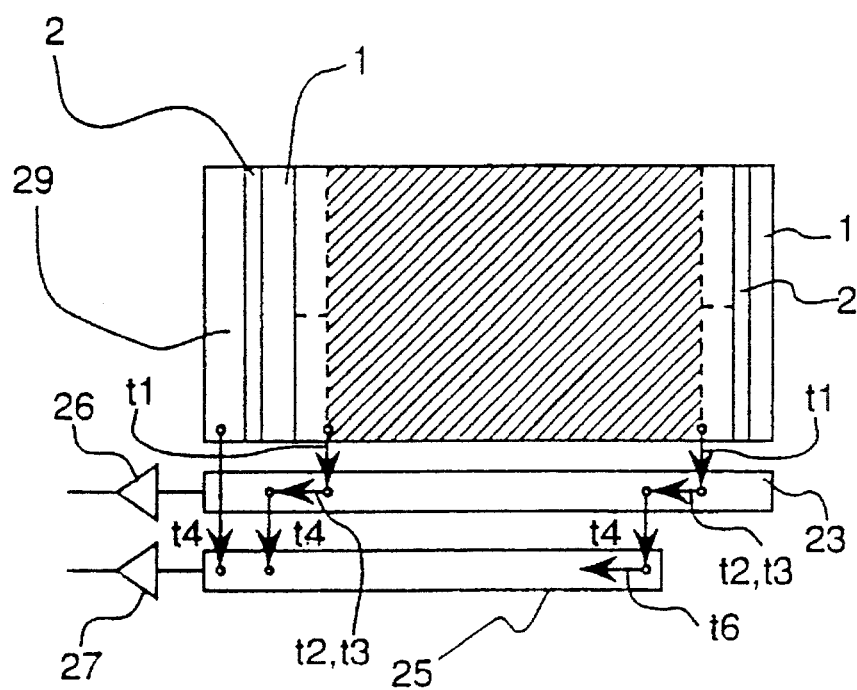
FIG. 17 is an operation conceptual diagram of the CCD solid state imaging device according to the fifth aspect of the present invention.

The general function of the fifth embodiment device is described hereinafter. As shown in FIG. 17, horizontal optical black signal charges generated by the horizontal optical black portion 29 can be transferred from a vertical CCD 2 to the second horizontal CCD 25 via the first horizontal CCD 23 without being mixed with the charges that are being transferred by the first horizontal CCD 23, that is, independently of the charges generated by the light receiving portion 1.

As a result, it becomes possible to utilize horizontal optical black signals not only to create a wide aspect ratio image by charges transferred by the first horizontal CCD 23, but also to create a narrow aspect ratio image by signal charges transferred by the second horizontal CCD 25.

In this case, as shown in FIG. 17, at a period t1, only charges of the light receiving portion 1 are transferred from the vertical CCD 2 to the first horizontal CCD 23. Thereafter, charges in the optical black portion 29 are transferred to the second horizontal CCD 25 via the first horizontal CCD 23 at a period t4, and simultaneously the charges that have been transferred from the light receiving portion to the first horizontal CCD 23 at the period t1 are transferred to the second horizontal CCD 25.

Figure 18:
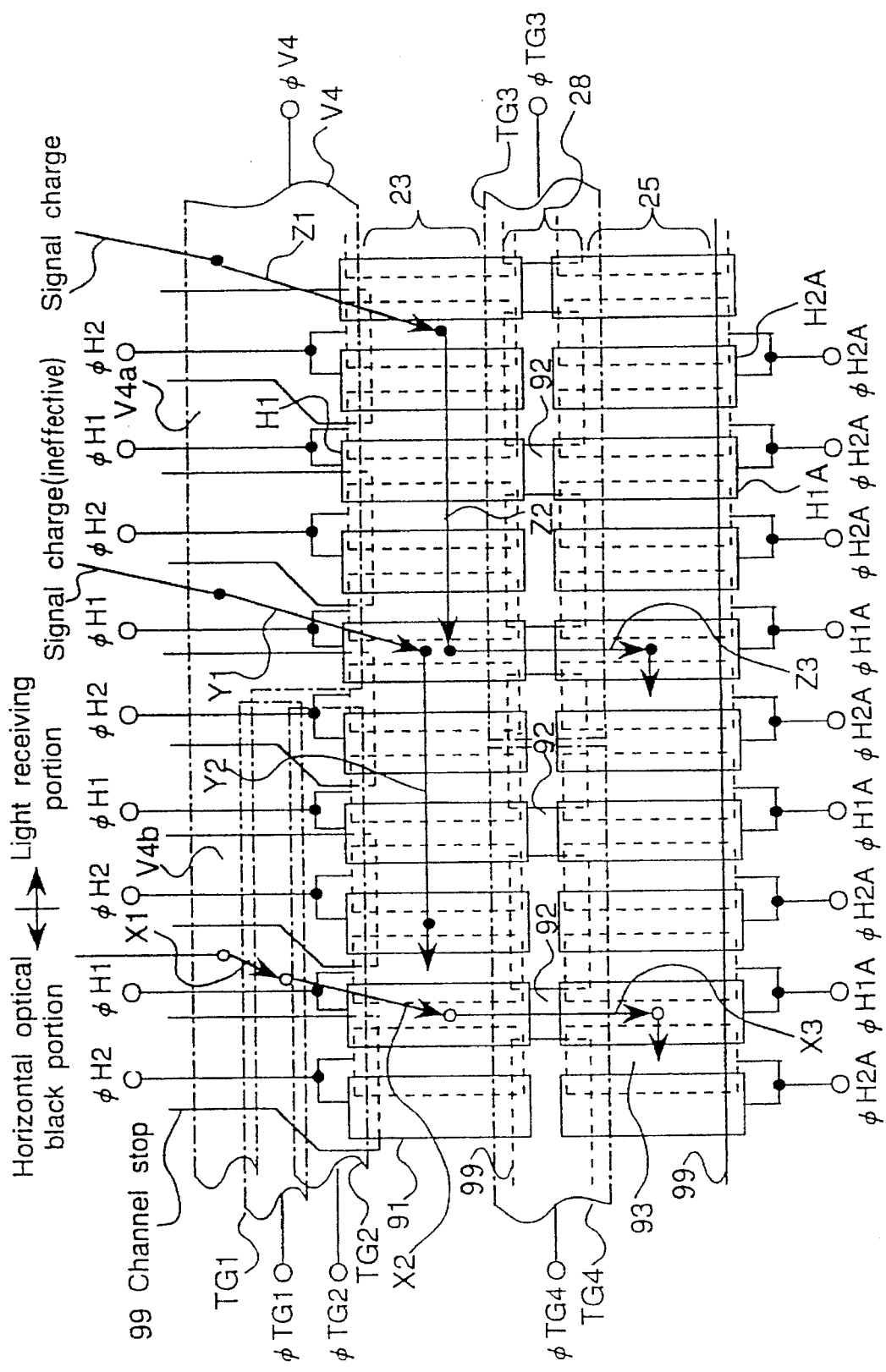
FIG. 18 is a view showing the detail of the horizontal CCDs of the embodiment according to the fifth aspect of the invention.

Detailed structure of a first horizontal CCD 23 and a second horizontal CCD 25 of the fifth embodiment is shown in FIG. 18. As shown in FIG. 18, the first horizontal CCD 23 has a channel 91, and horizontal transfer gate electrodes H1, H2. Also, the second horizontal CCD 25 has a channel 93 and horizontal transfer gate electrodes H1A, H2A. The channel 91 of the first horizontal CCD 23 and the channel 93 of the second horizontal CCD 25 are connected to each other by a connecting channel 92 located between the gate electrodes H1 and H1A and under gate electrodes TG4 and TG3.

Referring to FIG. 18, a larger-width portion V4a of a gate electrode V4 functions to transfer light receiving portion signal charges generated by the light receiving portion 1 to the first horizontal CCD 23 via the vertical CCD 2. Also, a smaller-width portion V4b of the gate electrode V4 and gate electrodes TG1 and TG2 function to transfer horizontal optical black signal charges generated by the horizontal optical black portion 29 to the channel 91 of the first horizontal CCD 23. Furthermore, the gate electrode TG4 functions to transfer the horizontal optical black signal charges from the first horizontal CCD 23 to the second horizontal CCD 25. The gate electrode TG3 functions to transfer the light receiving portion signal charges from the first horizontal CCD 23 to the second horizontal CCD 25. The connecting channel 92, and the gate electrodes TG3 and TG4 make up a coupling 28.

In this way, the fifth embodiment device is so arranged that a portion of the vertical CCD 2 corresponding to the horizontal optical black portion 29 and the first horizontal CCD 23 are connected to each other via two gate electrodes TG1 and TG2, thereby allowing signal charges generated by the horizontal optical black portion 29 and charges generated by the light receiving portion 1 to be transferred independently of each other.

Also, the gate electrode for controlling charge transfer from the first horizontal CCD 23 to the second horizontal CCD 25, unlike those in the foregoing embodiments, is divided into two electrodes of TG3 and TG4. Therefore, charges generated by the horizontal optical black portion 29 and charges generated by the light receiving portion 1 can be transferred independently of each other.

Furthermore, the potential of the connecting channel 92 under the gate electrode TG4 is made deeper than that of the channel 91. Also, a potential difference is provided by ion implantation between a part of the channel 91 under the gate electrode H1 and a part of the channel 91 under the gate electrode H2. By setting the potentials of the channel 91 and the channel 92 in this way, charges generated by the horizontal optical black portion 29 can be prevented from being mixed into charges generated by the light receiving portion 1. Besides, the setting of the potentials of the channels 91 and 92 is also necessitated for orientation of charge transfer.

Figure 19:
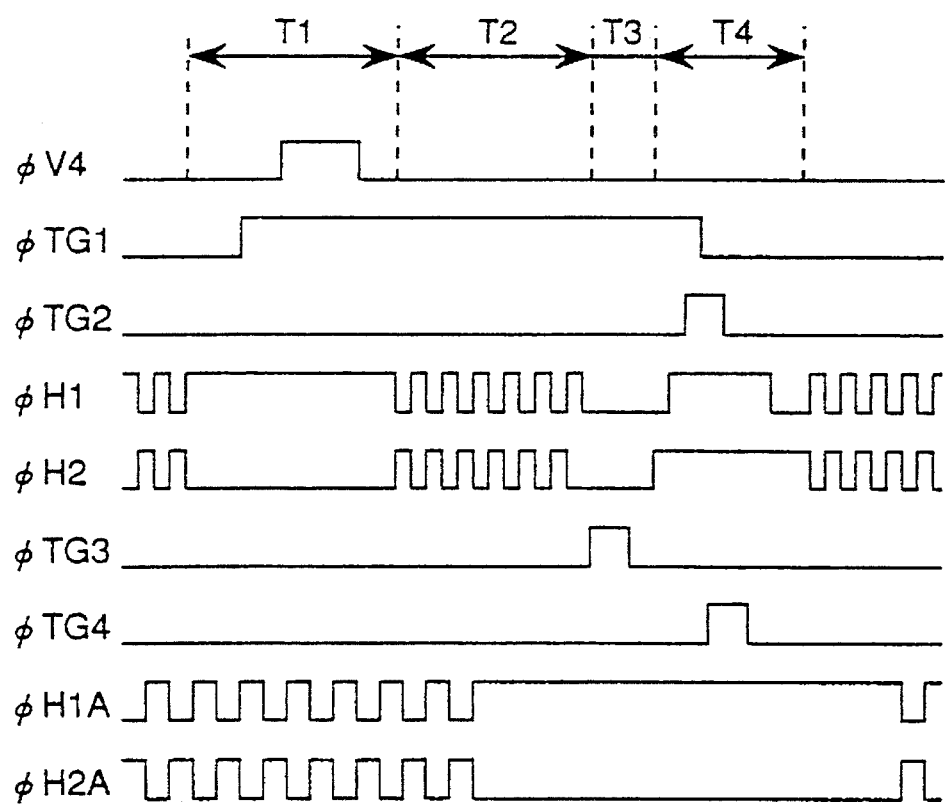
FIG. 19 is a driving timing chart of the same embodiment.

In FIG. 19, there is shown a timing chart of driving pulse signals φH1 and φH2, φH1A and φH2A, φV4 and φTG1 to φTG4 to be applied to the gate electrodes H1 and H2, H1A and H2A, V4 and TG1 to TG4 in the case of a narrow aspect ratio.

First, during a period T1 as shown in FIG. 19, signal charges generated by the light receiving portion 1 are transferred from the vertical CCD 2 to the channel 91 of the first horizontal CCD 23, as shown by routes Y1 and Z1 in FIG. 18, by a driving pulse signal φV4 applied to the gate electrode V4. At the same time, horizontal optical black signal charges generated by the horizontal optical black portion 29 are transferred to and accumulated under the gate electrode TG1 via the smaller-width portion V4b of the gate electrode V4, as shown by a route X1 in FIG. 18.

Next, during a period T2, light receiving portion signal charges are transferred in the horizontal direction within the first horizontal CCD 23, as shown by routes Y2 and Z2 in FIG. 18, by driving pulse signals φH1 and φH2 applied to the gate electrodes H1 and H2 of the first horizontal CCD 23.

Subsequently, during a period T3, a driving pulse signal is applied to the gate electrode TG3. Then the signal charges transferred to under the gate electrode H1 of the first horizontal CCD 23 via the routes Z1 and Z2 are transferred to under the gate electrode H1A of the second horizontal CCD 25 through a route Z3, i.e. through under the gate electrode TG3 of the coupling 28.

Further next, during a period T4, after the signal charges have reached the first horizontal CCD 23 via the route Y1, unnecessary light receiving portion signal charges remaining in the first horizontal CCD 23 are transferred to under the gate electrode H2. Also during the period T4, horizontal optical black signal charges accumulated under the gate electrode TG1 are transferred to under the gate electrode H1A sequentially through under the gate electrodes TG2, H1, and TG4, as shown by routes X2 and X3. That is, the horizontal optical black signal charges are transferred to the second horizontal CCD 25 via the first horizontal CCD 23 without being mixed in the light receiving portion signal charges that pass through the routes Y1 and Y2 or the routes Z1 and Z2.

Thereafter, the above horizontal optical black signal charges and the above light receiving portion signal charges are serially transferred from the second horizontal CCD 25 to an output circuit 27. Also, unnecessary light receiving portion signal charges are swept out from the first horizontal CCD 23.

In this way, according to the fifth embodiment, horizontal optical black signal charges generated by the horizontal optical black portion 29 can be transferred from the vertical CCD 2 to the second horizontal CCD 25 via the first horizontal CCD 23 without being mixed with charges that are being transferred by the first horizontal CCD 23, independently of charges generated by the light receiving portion 1.

Consequently, according to the fifth embodiment, horizontal optical black signals can be utilized not only to create a wide aspect ratio image by charges transferred by the first horizontal CCD 23 but also to create a narrow aspect ratio image by charges transferred by the second horizontal CCD 25.

In addition, the second, third and fourth embodiment devices may be further provided with the horizontal optical black portion 29, the smaller-width portion V4b of the gate electrode V4, and the gate electrodes TG1, TG2, TG4 of the fifth embodiment device.

Sixth Embodiment

Figure 20:
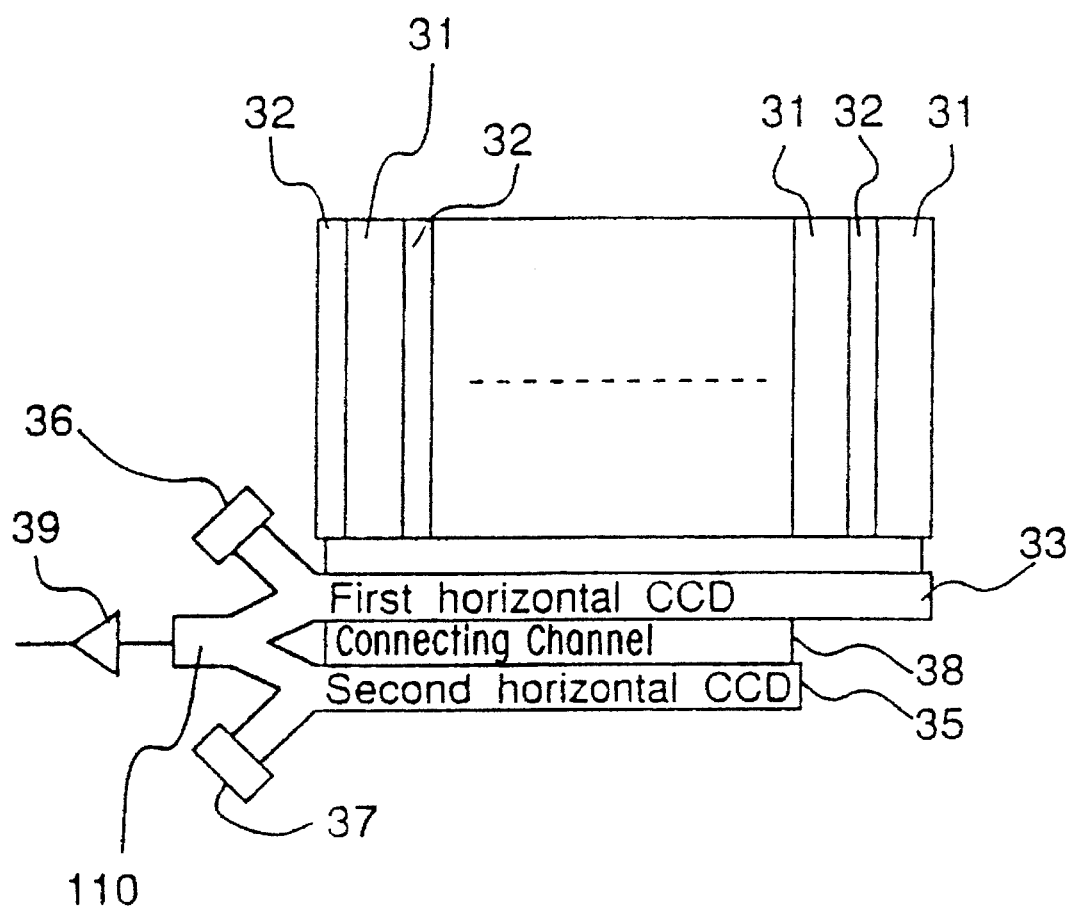
FIG. 20 is a block diagram of a CCD solid state imaging device of an embodiment according to the sixth aspect of the present invention.

Next, FIG. 20 is a block diagram of a sixth embodiment according to the sixth aspect of the present invention. As shown in FIG. 20, the sixth embodiment device comprises a light receiving portion 31, a vertical CCD 32, a first horizontal CCD 33, a second horizontal CCD 35, a coupling 38, a coupling CCD 110, a first drain 36, a second drain 37, and an output circuit 39.

The sixth embodiment differs from the first embodiment according to the first aspect of the invention shown in FIG. 1 only in that the device has the first and second horizontal CCDs each provided with a drain and connected at their forward ends in the direction of charge transfer and that it has a single output circuit. Thus, these differences are mainly described below.

As shown in FIG. 20, the first horizontal CCD 33 and the second horizontal CCD 35 are coupled with each other at their forward ends in the direction of charge transfer by a coupling CCD 110. Also, the first horizontal CCD 33 and the second horizontal CCD 35 are provided with a first drain 36 and a second drain 37, respectively, for discharging unnecessary charges. Further, this embodiment device has an output circuit 39, to which signal charges are transferred from the coupling CCD 110.

Figure 21:
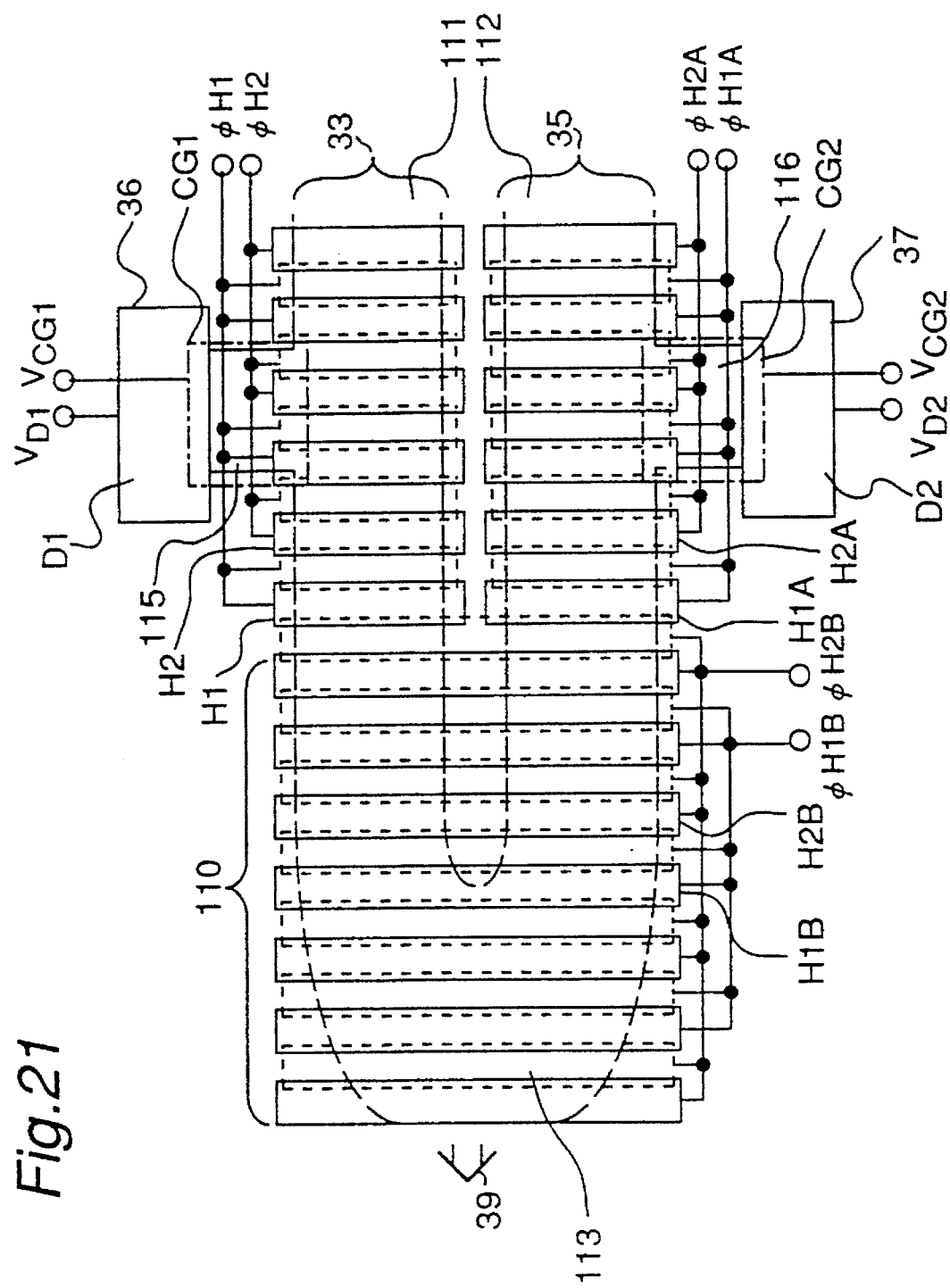
FIG. 21 is a view showing the detail of the horizontal CCDs of the embodiment according to the sixth aspect of the invention.

Detailed structure in the vicinity of the coupling CCD 110 that couples the first horizontal CCD 33 and the second horizontal CCD 35 with each other is shown in FIG. 21. As shown in FIG. 21, a channel 111 of the first horizontal CCD 33 and a channel 112 of the second horizontal CCD 35 are coupled with each other by a channel 113 of the coupling CCD 110. Also, the coupling CCD 110 has gate electrodes H1B and H2B of such a configuration as if the gate electrodes H1 and H2 of the first horizontal CCD 33 and the gate electrodes H1A and H2A of the second horizontal CCD 35 were coupled together. The gate electrodes H1B and H2B of the coupling CCD 110 are to be driven by gate clock signals φH1B and φH2B that are generated by the same clock as the one by which driving pulse signals φH1, φH2, φH1A, and φH2A applied to the gate electrodes H1, H2, H1A, and H2A of the first and second horizontal CCDs 33 and 35 are generated.

Further, a gate electrode D1, a gate electrode CG1, and a channel 115 sandwiched by the gate electrodes D1 and CG1 make up the first drain 36. A gate electrode D2, a gate electrode CG2, and a channel 116 sandwiched by the gate electrodes D2 and CG2 make up the second drain 37.

According to the sixth embodiment, by applying specified driving pulse signals to the gate electrodes D1 and CG1, unnecessary signal charges and dark-current charges that are present in the channel 111 of the first horizontal CCD 33 can be discharged from-the first drain 36. Also, by applying specified driving pulse signals to the gate electrodes D2 and CG2, unnecessary signal charges and dark-current charges that are present in the channel 112 of the second horizontal CCD 35 can be discharged from the second drain 37.

Further, according to the sixth embodiment, since the first horizontal CCD 33 and the second horizontal CCD 35 are coupled with each other at their ends by the coupling CCD 110, one output circuit 39 connected to the coupling CCD 110 can be shared between the first horizontal CCD 33 and the second horizontal CCD 35.

Consequently, according to the sixth embodiment, charges present in the horizontal CCD 33 or 35 of unnecessary lines are flowed out to the drain 36 or 37 before joined together by the coupling CCD 110, allowing only wanted signal charges to be led to the output circuit 39 from the coupling CCD 110, whereby an image signal can be outputted from the single output circuit 39. As a result, image signals of two types of aspect ratios (e.g. 16 : 9 and 4 : 3) can be obtained from the single output circuit 39.

In addition, the second, third, and fifth embodiment devices may be further provided with the first and second drains 36 and 37, and the coupling CCD 110 of the sixth embodiment device.

As apparent from the above description, the CCD solid state imaging device according to the first aspect of the invention comprises a light receiving portion, a vertical CCD, a first horizontal CCD, and a second horizontal CCD to which signal charges are transferred from the first horizontal CCD via a coupling.

Therefore, according to the present invention, for creation of a wide aspect ratio image, an image can be created by signal charges transferred by the first horizontal CCD. On the other hand, by creating an image by signal charges transferred from the first horizontal CCD to the second horizontal CCD via the coupling, it becomes possible to create a narrow aspect ratio image shorter in the horizontal dimension than the above wide aspect ratio image by making use of an arbitrary horizontal area of all the effective pixels of the light receiving portion, depending on the area where the first horizontal CCD and the second horizontal CCD are connected together by the above coupling.

Also, the CCD solid state imaging device according to the second aspect of the present invention comprises charge discharging means for discharging at least part of charges present in the first horizontal CCD at any arbitrary time point. Therefore, according to the second aspect of the invention, in obtaining a narrow aspect ratio image, when charges are transferred from the first horizontal CCD to the second horizontal CCD, unnecessary charges remaining in the first horizontal CCD can be discharged via the drain, thus allowing a narrow aspect ratio image to be obtained even when the first horizontal CCD and the second horizontal CCD are driven at the same frequency.

Further, the CCD solid state imaging device according to the third aspect of the present invention comprises charge discharging means for discharging at least part of charges present in the second horizontal CCD at any arbitrary time point. Therefore, according to the third aspect of the invention, after a narrow aspect ratio image has been obtained by effecting horizontal transfer by the second horizontal CCD, unnecessary charges remaining in the second horizontal CCD can be discharged via the charge discharging means, thus allowing an image of an arbitrary aspect ratio horizontally narrower than the length of the second horizontal CCD to be obtained.

Further, the CCD solid state imaging device according to the fourth aspect of the present invention comprises the second horizontal CCD having a charge transfer ability of transferring all of charges transferred from the vertical CCD, and further charge discharging means for discharging at least part of charges present in the second horizontal CCD at any arbitrary time point. Therefore, according to the fourth aspect of the invention, in obtaining a wide aspect ratio image, charges from the vertical CCD are transferred to the second horizontal CCD without effecting horizontal transfer by the first horizontal CCD. Then, a wide aspect ratio image is obtained from the charges outputted from the second horizontal CCD. Also, in obtaining a narrow aspect ratio image, after a narrow aspect ratio image has been obtained by effecting horizontal transfer by the second horizontal CCD, unnecessary charges remaining in the second horizontal CCD can be discharged via the charge discharging means. In this way, according to the fourth aspect of the invention, it becomes possible to obtain an image of any arbitrary aspect ratio from wide to narrow aspect ratios only from the output of the second horizontal CCD.

Further, according to the fifth aspect of the present invention, horizontal optical black signal charges generated by the horizontal optical black portion can be transferred from the vertical CCD to the second horizontal CCD without being mixed with charges that are being transferred by the first horizontal CCD, independently of charges generated by the light receiving portion. Therefore, the horizontal optical black signal can be utilized not only to create a wide aspect ratio image by the charges transferred by the first horizontal CCD, but also to create a narrow aspect ratio image by the signal charges transferred by the second horizontal CCD.

Further, according to the sixth aspect of the present invention, charges present in horizontal CCDs of unnecessary lines are flowed out to the drain before joined together by the coupling CCD, allowing only wanted signal charges to be led to the output circuit from the coupling CCD. Therefore, image signals of two kinds of aspect ratios can be obtained from the single output circuit.

As described above, according to the present invention, a low-cost CCD solid state imaging device can be realized which can make best use of effective pixels and which allows images of different two or more kinds of aspect ratios to be obtained without using digital signal processing or any optical means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A CCD type solid state imaging device, comprising:
    a light receiving portion for receiving light and generating charges corresponding to the light;
    a vertical CCD for transferring the charges from the light receiving portion in a vertical direction;
    a first horizontal CCD for receiving the charges from the vertical CCD and transferring the charges in a horizontal direction;
    a second horizontal CCD which is arranged in parallel to the first horizontal CCD and transfers the charges received from the first horizontal CCD in the same horizontal direction, said second horizontal CCD being shorter than the first horizontal CCD;
    a coupling for transferring the charges, which are being transferred in the horizontal direction by the first horizontal CCD, to the second horizontal CCD at any arbitrary time point during horizontal transfer by the first horizontal CCD;
    first output circuit connected to said first horizontal CCD and responding to an output of said first horizontal CCD to provide an image signal of a first aspect ratio; and
    second output circuit connected to said second horizontal CCD and responding to an output of said second horizontal CCD to provide an image signal of a second aspect ratio narrower than said first aspect ratio.

2. A CCD type solid state imaging device as claimed in claim 1, further comprising
    charge discharging means for discharging at least part of charges present in the first horizontal CCD at any arbitrary time point.

3. A CCD type solid state imaging device as claimed in claim 1, further comprising
    charge discharging means for discharging at least part of charges present in the second horizontal CCD at any arbitrary time point.

4. A CCD type solid state imaging device as claimed in claim 2, further comprising
    charge discharging means for discharging at least part of charges present in the second horizontal CCD at any arbitrary time point.

5. A CCD type solid state imaging device as claimed in claim 1, further comprising:
    a horizontal optical black portion adjacent to the light receiving portion;
    first gate electrode means for transferring horizontal optical black signal charges generated by the horizontal optical black portion to the first horizontal CCD; and
    second gate electrode means for transferring the horizontal optical black signal charges from the first horizontal CCD to the second horizontal CCD.

6. A CCD type solid state imaging device as claimed in claim 2, further comprising:
    a horizontal optical black portion adjacent to the light receiving portion;
    first gate electrode means for transferring horizontal optical black signal charges generated by the horizontal optical black portion to the first horizontal CCD; and
    second gate electrode means for transferring the horizontal optical black signal charges from the first horizontal CCD to the second horizontal CCD.

7. A CCD type solid state imaging device as claimed in claim 3, further comprising:
    a horizontal optical black portion adjacent to the light receiving portion;
    first gate electrode means for transferring horizontal optical black signal charges generated by the horizontal optical black portion to the first horizontal CCD; and
    second gate electrode means for transferring the horizontal optical black signal charges from the first horizontal CCD to the second horizontal CCD.

8. A CCD type solid state imaging device, comprising:
    a light receiving portion for receiving light and generating charges corresponding to the light;
    a vertical CCD for transferring the charges from the light receiving portion in a vertical direction;
    a first horizontal CCD for receiving the charges from the vertical CCD and transferring the charges in a horizontal direction;
    a second horizontal CCD which is arranged in parallel to the first horizontal CCD and transfers the charges received from the first horizontal CCD in the same horizontal direction, said second horizontal CCD being shorter than the first horizontal CCD;
    a coupling for transferring the charges, which are being transferred in the horizontal direction by the first horizontal CCD, to the second horizontal CCD at any arbitrary time point during horizontal transfer by the first horizontal CCD;
    an output circuit connected to said first and second horizontal CCDs responding to outputs of said first and second horizontal CCDs to provide an image signal of a first aspect ratio and an image signal of a second aspect ratio narrower than said first aspect ratio;
    a first drain for discharging charges present in the first horizontal CCD;
    a second drain for discharging charges present in the second horizontal CCD; and
    a coupling CCD for coupling the first horizontal CCD and the second horizontal CCD with each other at their ends in proximity to a charge output circuit.

9. A CCD type solid state imaging device as claimed in claim 8, further comprising:
    charge discharging means for discharging at least part of charges present in the first horizontal CCD at any arbitrary time point.

10. A CCD type solid state imaging device as claimed in claim 8, further comprising:
    charge discharging means for discharging at least part of charges present in the second horizontal CCD at any arbitrary time point.

11. A CCD type solid state imaging device as claimed in claim 8, further comprising: a horizontal optical black portion adjacent to the light receiving portion;
    first gate electrode means for transferring horizontal optical black signal charges generated by the horizontal optical black portion to the first horizontal CCD; and
    second gate electrode means for transferring the horizontal optical black signal charges from the first horizontal CCD to the second horizontal CCD.

* * * * *